United States Patent [19]

Kasima et al.

[11] 4,059,079
[45] Nov. 22, 1977

[54] INTERNAL COMBUSTION ENGINE

[75] Inventors: Osamu Kasima, Kariya; Shougo Sanda, Okazaki, both of Japan

[73] Assignees: Nippondenso Co., Ltd., Kariya; Toyota Jidosha Kogyo Kabushiki Kaisha, Toyota, both of Japan

[21] Appl. No.: 620,506

[22] Filed: Oct. 7, 1975

[30] Foreign Application Priority Data

Oct. 8, 1974    Japan .......................... 49-122531[U]

[51] Int. Cl.² ............................................. F02B 3/00
[52] U.S. Cl. .............................. 123/30 D; 123/32 SP; 123/191 S
[58] Field of Search ........... 123/30 D, 32 SP, 32 ST, 123/75 B, 191 S, 169 R, 169 EL, 169 MG, 32 SA

[56] References Cited

U.S. PATENT DOCUMENTS

| 1,322,493 | 11/1919 | Little | 123/169 R X |
|---|---|---|---|
| 1,547,918 | 7/1925 | Howard | 123/169 MG |
| 1,813,781 | 7/1931 | Thomas et al. | 123/32 SP |
| 2,231,173 | 2/1941 | Starr | 123/32 SP |
| 2,305,208 | 12/1942 | Trammell et al. | 123/169 EL |
| 2,534,346 | 12/1950 | Fenney | 123/32 ST |
| 2,753,852 | 7/1956 | Beller | 123/32 SP |
| 3,443,552 | 5/1969 | Seggern et al. | 123/75 B |
| 3,968,782 | 7/1976 | Noguchi et al. | 123/32 SP |
| 3,980,057 | 9/1976 | Sanda et al. | 123/32 SP |
| 4,000,731 | 1/1977 | Noguchi et al. | 123/32 SP |
| 4,004,563 | 1/1977 | Nakamura et al. | 123/32 SP |

Primary Examiner—Ronald H. Lazarus
Assistant Examiner—Craig R. Feinberg
Attorney, Agent, or Firm—Cushman, Darby & Cushman

[57] ABSTRACT

A torch ignition type internal combustion engine has a precombustion chamber formed in a cylinder head in communication with a main combustion chamber through a passage so that a part of a lean air-fuel mixture is forced into the precombustion chamber on compression stroke. A spark plug is mounted on the cylinder head to ignite the lean air-fuel mixture in the precombustion chamber so that the ignited air-fuel mixture is burnt therein to form a torch jet which runs from the precombustion chamber through the passage into the main combustion chamber to ignite the lean air-fuel mixture therein. The spark plug has an insulator extending at one end axially beyond that end face of a metal shell of the spark plug from which grounded electrodes extend. The one end of the insulator supports a center electrode. The spark plug is so positioned that a set of electrodes and the one end of the insulator are disposed in the passage so that the electrodes and the end of the insulator are exposed to successive torch jets running through the passage, whereby deposition of sooty carbon on the electrodes and the end of the insulator is burnt away.

5 Claims, 8 Drawing Figures

FIG. 6
| POSITION OF SPARK PLUG | SHAPE OF SPARK PLUG | CAR SPEED (Km/H) 40 | | 50 | | 60 | | 70 | | 80 |
|---|---|---|---|---|---|---|---|---|---|---|
| FIG. 1 | FIG. 2 | × | × | × | × | × | × | × | × | × |
| FIG. 1 | FIG. 5 | × | × | × | × | × | × | × | × | × |
| FIG. 3 | FIG. 2 | × | × | × | × | × | ○ | | | |
| FIG. 3 | FIG. 5 | × | × | ○ | | | | | | |
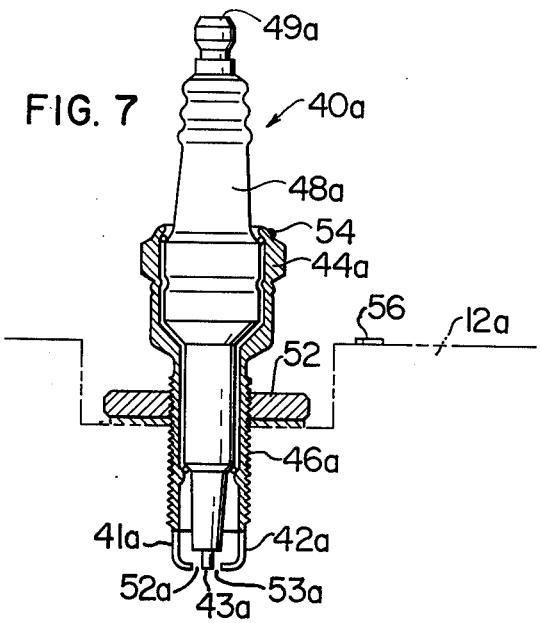
FIG. 7
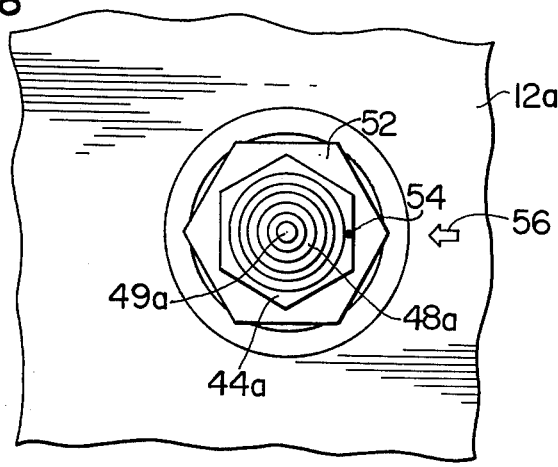
FIG. 8

INTERNAL COMBUSTION ENGINE

BACKGROUND OF THE INVENTION

1. Field of the Invention

The present invention relates to a so-called "torch ignition type internal combustion engine" having a pre-combustion chamber for receiving an air-fuel mixture which is initially ignited by a spark plug to form a torch jet by means of which an air-fuel mixture in a main combustion chamber is ignited to generate power. More particularly, the invention relates to an internal combustion engine of the mentioned class in combination with an improved spark plug.

2. Description of the Prior Art

The conventional spark ignition type internal combustion engine generally has a combustion chamber in which an air-fuel mixture is ignited by a spark plug. The emission of harmful components of engine exhaust gases has recently been a public problem. In an attempt to solve the problem, researches have been made to operate engines with lean air-fuel mixtures in order that the harmful exhaust components might be reduced. As a result of the researches, there has been developed the so-called "torch ignition type" internal combustion engine which has a main combustion chamber defined by a cylinder in a cylinder block, a piston in the cylinder and a cylinder head mounted on the cylinder block. A precombustion chamber is provided separately of the main combustion chamber but communicated therewith by a passage. The main combustion chamber and the precombustion chamber are supplied with charges of air-fuel mixtures which may be of either the same or different air-fuel ratio. The mixture charge in the precombustion chamber is first ignited by a spark plug to form a flame which is called "torch jet" which runs through the passage into the main combustion chamber to ignite the air-fuel mixture charge therein. The air-fuel mixture charges are sufficiently lean as a whole to reduce the harmful components of the engine exhaust gases.

The spark plug used in this kind of internal combustion engine is so mounted on the engine that the spark producing section of the plug is positioned near to the passage so as to eliminate the reduction of the ignitability of the spark plug which would otherwise be caused by the residual gases remaining in the precombustion chamber. This positioning of the spark producing section of the spark plug, however, tends to cause the electrodes and, particularly, the grounded electrode, to be overheated. In order to prevent the overheat, therefore, the spark plug used is of a high heat value and of a design that the grounded electrode is shorter compared with the ordinary spark plug to avoid the overheat of the grounded electrode as much as possible. Because of this design, the end of a tubular metal shell to which the grounded electrode is connected extends axially beyond the end of an insulator supporting the central electrode.

With the spark plug of the discussed design, when the engine is operated in such a condition that an air-fuel mixture in the precombustion chamber produces a sooty carbon, the carbon is deposited on the insulator around the central electrode. Because the spark plug is of the high heat value and the transfer of the heat from the spark producing section of the plug to the cylinder head is good, the insulator around the center electrode is at a temperature which is not high enough to burn away the deposit of carbon when the engine is running at an ordinary or coasting speed. The deposition of carbon on the insulator around the center electrode is thus increased, so that the insulation resistance of the insulator around the center electrode is reduced, with a result that a misfire is caused.

SUMMARY OF THE INVENTION

The present invention aims to burn away or prevent the formation of a sooty carbon deposit on the insulator around the center electrode of the spark plug by employing, in a torch ignition type internal combustion engine, a spark plug design in which the insulator around the center electrode (this portion of the insulator will be termed hereunder "nose portion") extends axially beyond the end face of the shell of the spark plug to which a grounded electrode is connected and by positioning the spark plug on the engine so that the electrodes and the nose portion of the insulator are exposed to a torch jet running from a precombustion chamber through a passage into a main combustion chamber. This feature of the invention assures that the torch jet impinges at a high velocity upon the electrodes and the nose portion of the insulator to heat them so that a deposit of carbon of these parts, if any, are burnt by the heat and, in addition, removed therefrom by the blow of the torch jet.

The spark plug is mounted on a cylinder head and positioned such that the electrodes and the nose portion of the insulator are disposed in the vicinity of the passage. Preferably, the electrodes and the nose portion may project into the passage. This positioning of the spark plug prevents misfire and improves the ignitability of air-fuel mixture charges in the precombustion chamber and main combustion chamber.

The grounded electrode of the plug used in the engine has a bent end portion extending toward the center electrode to define with the peripheral surface thereof a spark gap. This feature advantageously avoids the use of a long grounded electrode which otherwise would extend a large distance into the passage and, thus, would be overheated by successively produced torch jets.

Preferably, the spark plug may be so mounted on the cylinder head that the bent end portion of the grounded electrode extends sustantially in parallel with the path of run of the torch jet through the passage to make minimum the resistance of the bent portion of the grounded electrode to the flow of an air-fuel mixture through the passage into the precombustion chamber and to the run of a torch jet through the passage out of the precombustion chamber. For this purpose, the cylinder head and the spark plug may preferably be provided with markings which indicate the orientation of the bent end portion of the grounded electrode with respect to the path of run of the torch jet through the passage.

The spark plug may be conventionally mounted on the cylinder head by means of screw threads formed on the shell of the spark plug and in the cylinder head. The spark plug may be provided with a nut member in threadable engagement with the screw threads on the shell. When the spark plug has been screwed into the cylinder head to a position in which the markings on the cylinder head and the spark plug indicate that the bent end portion of the grounded electrode extends parallel to the path of run of a torch jet through the passage, but if the spark plug has not been tightened to the cylinder head yet, the nut member may be rotated relative to the shell of the spark plug to tightly secure the plug to the cylinder head.

The spark plug may be provided with a pair of grounded electrodes disposed in diametrically opposite relationship with respect to each other.

BRIEF DESCRIPTION OF DRAWINGS

FIG. 6 is a graphical illustration of the results of tests concerning the burning of carbon deposit away from the nose portions of spark plugs shown in FIGS. 2 and 5 and positioned as shown in FIGS. 1 and 3;

FIG. 7 illustrates, in a fragmentary partially sectional elevation, a modified embodiment of the invention; and FIG. 8 is a fragmentary top plan view of the embodiment shown in FIG. 7.

DESCRIPTION OF PREFERRED EMBODIMENTS

Figure 5:
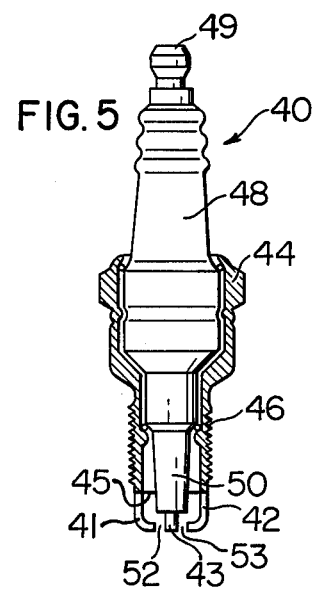
FIG. 5 is a view similar to FIG. 2 but illustrating a spark plug used in the engine shown in FIGS. 3 and 4.
Figure 3:
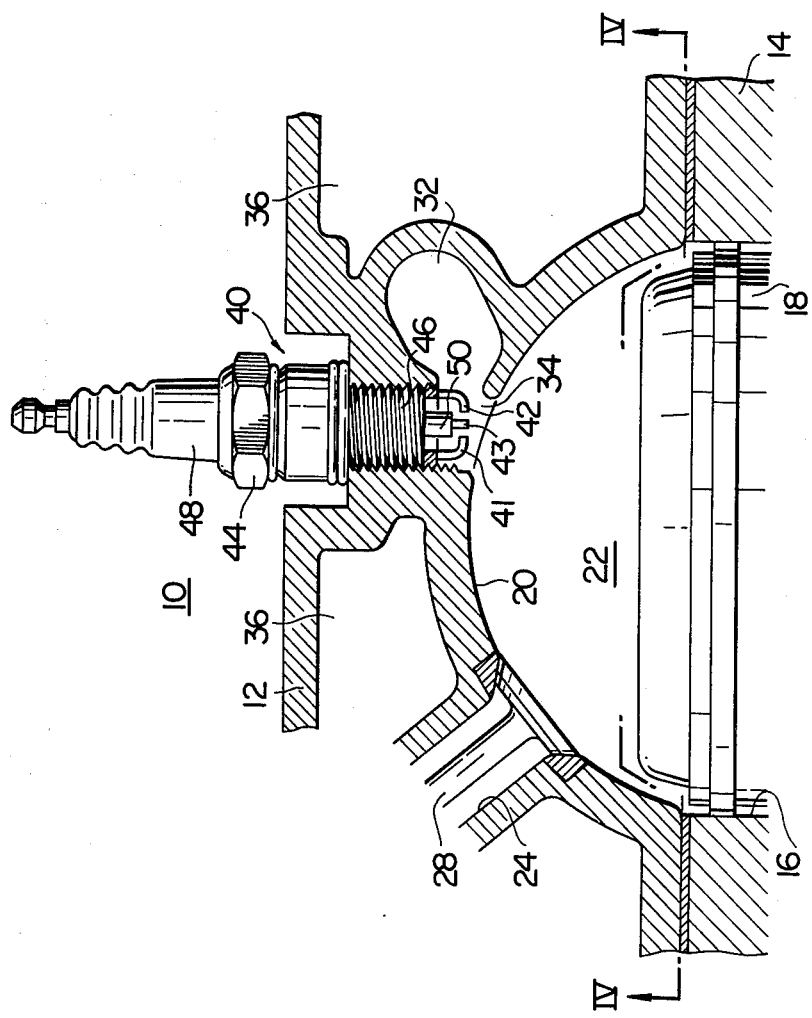
FIG. 3 is a view similar to FIG. 1 but illustrating an embodiment of the internal combustion engine according to the present invention.
Figure 4:
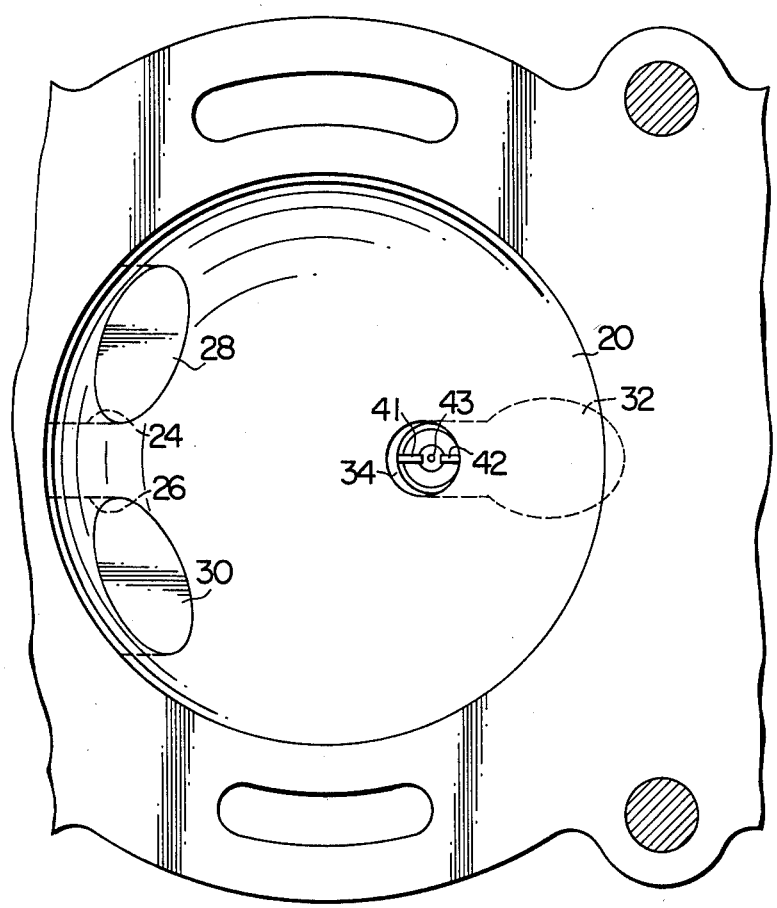
FIG. 4 is a fragmentary bottom view of a cylinder head of the engine shown in FIG. 3 as viewed on the line IV — IV in FIG. 3.

Referring first to FIGS. 3, 4 and 5, a preferred embodiment of the torch ignition type internal combustion engine of the present invention is generally designated by 10 and comprises a cylinder head 12 mounted on the top of a cylinder block 14 defining therein a cylinder 16 in which a piston 18 is reciprocally housed. The cylinder head 12 above the piston 18 is formed with a concave recess 20 which cooperates with the top face of the piston and the inner peripheral surface of the cylinder 16 to define a main combustion chamber 22. It will be noted that, when the piston is moved to its top dead center, the main combustion chamber 22 is defined substantially by the recess 20 and the top face of the piston 18 only, as shown in FIG. 3.

Intake and exhaust ports 24 and 26 extend through the cylinder head 12 and are opened in the concave inner surface of the recess 20 above the piston 18. Intake and exhaust valves 28 and 30 are provided in the intake and exhaust ports 24 and 26, respectively, to open and close the intake and exhaust ports in well-known manner.

The cylinder head 12 defines therein a precombustion chamber 32 which has a volume substantially smaller than that of the main combustion chamber 22 and which is always communicated therewith through a passage 34. As will be seen in FIG. 3, the axis of the passage 34 extends substantially toward the center of the main combustion chamber 22 when it is defined by the recess 20 and the piston 18 (i.e., when the piston is in its top dead center). Cooling water passages 36 are formed in the cylinder head 12 in conventional manner.

A spark plug, generally designated by 40, is screwed into the cylinder head 12 so that the spark producing electrodes of the spark plug are disposed in the passage 34. More specifically, the spark plug 40 of the preferred embodiment has a pair of grounded electrodes 41 and 42 connected to the inner end face 45 of a generally tubular metal shell 44 in diametrically opposite relationship with respect to each other, as best ssen in FIGS. 4 and 5. Adjacent to the end face 45, the shell 44 has outer screw threads 46 by means of which the spark plug 40 is secured to the cylinder head 12. The shell 44 surrounds a part of an insulator 48 of a heat-resistant and electrically insulating material such as porcelain. The insulator 48 has a tapered nose portion 50 extending axially beyond the end face 45 of the shell 44. A center electrode 43 is supported by and axially extends from the nose portion 50 of the insulator 48. As best seen in FIGS. 3 and 5, the grounded electrodes 41 and 42 have end portions which are bent inwardly and extend toward the center electrode 43 to cooperate therewith to define spark gaps 52 and 53 between the inner end extremities of the grounded electrodes 41 and 42 and the peripheral surface of the end portion of the center electrode 43. The center electrode 43 is electrically connected in conventional manner to a terminal 49 supported by the end of the insulator 48 remote from the nose portion 50.

Referring again to FIGS. 3 and 4, it will be seen that the grounded and central electrodes 41 to 43 are disposed in the passage 34 and arranged such that a row of these electrodes extends substantially parallel with the axis of the passage 34. It will also be seen that not only the electrodes 41 to 43 but also the nose portion 50 of the insulator 48 extend into the passage 34. The reason for the positioning and arrangement will be made apparent later.

In operation, a charge of a lean air-fuel mixture produced by a conventional air-fuel mixture supplying means (not shown) is introduced into the main combustion chamber 22 when the intake valve 28 is open. The mixture charge is then compressed by the upward movement of the piston 18. Thus, a part of the mixture charge in the main combustion chamber 22 is forced into the precombustion chamber 32. Then, a high voltage is applied to the spark plug 40 by means of ignition circuit (not shown) so that a spark discharge is produced between the center electrode 43 and one or both of the grounded electrodes 41 and 42 to ignite the air-fuel mixture charge in the precombustion chamber 32. By this ignition, the air-fuel mixture charge in the precombustion chamber 32 is burnt to produce a pressure rise in the precombustion chamber so that a pressure difference is caused between the precombustion chamber 32 and the main combustion chamber 22. Because of this pressure difference, the flame produced in the precombustion chamber runs through the passage 34 to form a torch jet which spurts into the main combustion chamber 22. As the sectional area of the passage 34 is smaller than that of the precombustion chamber 32, the torch jet spurts from the passage 34 at a high velocity into the main combustion chamber 22 to surely ignite the air-fuel mixture charge therein.

It will be appreciated that the air-fuel mixture charges in the main combustion chamber 22 and the precombustion chamber 32 are of the same air-fuel ratio which is substantially equal to 18 in the illustrated embodiment of the invention. It is to be noted that an air-fuel mixture at air-fuel ratio of 18 will not be ignitable at all by a spark plug if the precombustion chamber 32 is not provided and if the electrodes of the spark plug are disposed in the main combustion chamber. The reason why the air-fuel mixture at air-fuel ratio of about 18 is ignitable without fail by the spark plug 40 in the engine according to the present invention is believed to be the velocity of the movement or flow of the air-fuel mixture around the electrodes 41 to 43 is kept as low as possible, for example, 2 to 3 m/sec., at the time of ignition due to the construction and arrangement of the precombustion chamber 32 and the passage 34 and that, in contrast with the prior art shown in FIG. 1, because the spark plug electrodes 41 to 43 are positioned in the passage 34, the electrodes are free from any residual gases which are retained in the trap chamber 32 at the inner part thereof. In other words, since a part of the air-fuel mixture in the main combustion chamber 22 is pressed into the passage 34 and the prcombustion chamber 32 on the compression stroke of the engine, the residual gases in the trap chamber 32 are forced to the inner part of the precombustion chamber so that the electrodes 41 to 43 are surrounded by an entirely fresh air-fuel mixture charge at each spark-producing time.

The electrodes 41 to 43 and the nose portion 50 of the insulator 48 are heated by the torch jet running through the passage 34 to a temperature sufficiently high to burn the carbon. In addition, even if a deposit of sooty carbon is formed on the electrodes 41 to 43 and the nose portion 50, the torch jet when running through the passage 34 impinges upon these parts to blow away at least a part of the carbon deposit, with the result that the insulation resistance of the nose portion 50 will not be reduced.

With the design of the spark plug 40, the inwardly bent end portions of the grounded electrodes 41 and 42 and the peripheral surface of the center electrode 43 define therewith the spark gaps 52 and 53. The grounded electrodes 41 and 42 are shorter compared with the case wherein grounded electrode or electrodes is bent over the end extremity of a center electrode to define a spark gap or gaps as in the prior art spark plug shown in FIGS. 1 and 2. Thus, the grounded electrodes 41 and 42 are advantageously prevented from being overheated at their end extremities. In addition, the inwardly bent end portions of the grounded electrodes 41 and 42 of the spark plug 40 when mounted on the engine in position extend substantially parallel to the axis of the passage 34, as discussed above. This will mean that the bent end portions of these electrodes extend substantially in the same direction as the torch jet running through the passage 34 and the flow of an air-fuel mixture charge through the passage into the precombustion chamber 32. Thus, the grounded electrodes 41 and 42 give the minimized resistance to the flow of the air-fuel mixture charge and the run of the torch jet through the passage 34 into and out of the precombustion chamber 32, respectively.

Figure 1:
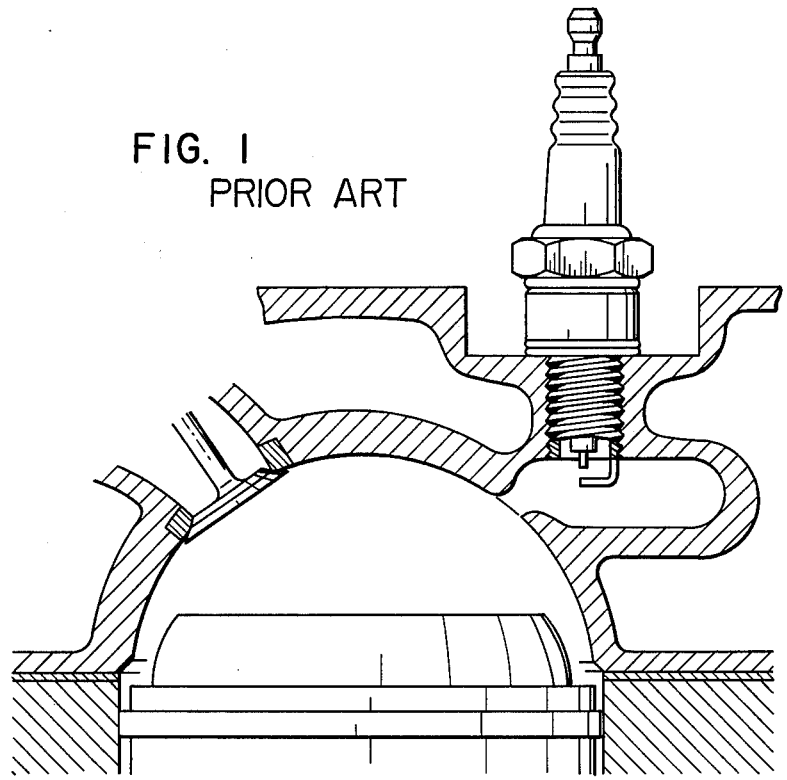
FIG. 1 is a fragmentary sectional view of the prior art torch ignition type internal combustion engine.
Figure 2:
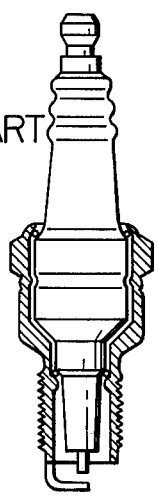
FIG. 2 is a partially sectional side elevation of a spark plug used in the internal combustion engine shown in FIG. 1.

FIG. 6 graphically illustrates the results of tests concerning the removal of the deposits of sooty carbon from the nose portions of the spark plugs shown in FIGS. 2 and 5 which were mounted on 4-cycle gasoline engines of the construction shown in FIGS. 1 and 3. The spark plugs were installed on the engines in the positions shown in FIGS. 1 and 3. The engines were operated with "leadless gasoline" (i.e., the gasoline which does not include tetraethyl lead). Prior to the tests, deposits of sooty carbon were formed on the nose portions of the spark plugs. Then, the spark plugs were installed on the engines at the positions referred to. Automobiles equipped with these engines were operated along a substantially plane road at a constant speed for about 2 minutes in the respective tests. Thereafer, the spark plugs were removed from the engines and examined. In the graph shown in FIG. 5, "x" indicates that the carbon deposits were not removed, while "o" indicates that the carbon deposits were removed. It will be seen in FIG. 6 that, with the plugs shown in FIGS. 2 and 5 and located at the position shown in FIG. 1 (i.e., at the intermediate position of the precombustion chamber), the carbon deposits on the noise portions of the plugs were not burnt away even at the engine speed corresponding to the car speed of 80 km/h, whereas, with the plugs shown in FIG. 2 and located at the position shown in FIG. 3, the carbon deposits were removed when the engine speed was increased up to car speed of 65 km/h. Moreover, with the plugs shown in FIG. 5 and located at the position shown in FIG. 3, the carbon deposits were removed even at the engine speed corresponding to the car speed of 50 km/h. In other words, according to the present invention, the carbon deposits on the nose portions of spark plugs can be burnt away at a low engine speed at which the nose portions are at a low temperature. After the 50 km/h test on the FIG. 3 engine with the FIG. 5 spark plugs 40, it was observed that the carbon deposits were removed by torch jets only at those parts of the nose portions 50 of the spark plugs which extend beyond the end faces 45 of the shells 44.

FIGS. 7 and 8 illustrate a modified embodiment of the invention, in which similar parts are indicated by similar reference numerals added with "a". The modified spark plug 40a is substantially identical in construction to the spark plug 40 with the exception that a threaded portion 46a of a shell 44a of the plug 40a is longer than the threaded portion 46 of the plug 40, that a nut member 52 is in threadable engagement with the theaded portion 46a and that a marking in the form of a spot 54 is provided on the outer end face of the shell 44a. A corresponding marking in the form of an arrow 56 is formed on the surface of a cylinder head 12a adjacent to the spark plug 40a. The arrangement is such that when the spark plug 40a has been screwed into the cylinder head 12a to a position in which the markings 54 and 56 are radially aligned, the row of electrodes 41a to 43a extends substantially parallel with the axis of the passage which communicates the main combustion chamber with the precombustion chamber (not shown in FIGS. 7 and 8), i.e., parallel with the path of run of the torch jet through the passage. In this position of the spark plug with respect to the axis of the passage, if the spark plug should be more tightly secured to the cylinder head 12a, the nut member 52 may be rotated relative to the spark plug 40a and the cylinder head 12a to further fasten the plug to the cylinder head.

In the illustrated embodiment, each of the spark plugs 40 and 40a has a pair of grounded electrodes. However, each spark plug may alternatively be provided with a single, three or four grounded electrode or electrodes. The larger the number of the grounded electrodes, the more uniform the wear of the end extremities of the grounded electrodes due to spark discharges, which increases the operative lives of the plugs.

In the internal combustion engine according to the present invention, the replacement of a spark plug by another one to vary the sectional area of the passage 34 provides another advantage. In summer season or a southern part of the world, the atomization of liquid fuel and, thus, the ignitability of the air-fuel mixture are better than in winter season or northern part of the world. Under the circumstance, therefor, the spark producing section of the spark plug may project into the passage a distance shorter than in the winter season or the northern part to increase the sectional area of the torch-running passage and expose a limited part of the spark producing section of the plug to torch jets so that the spark producing section is advantageously prevented from becoming overheated. On the other hand, since the vaporization and thus the ingnitability of fuel is poor in the winter season or the northern part, tending to cause a formation of carbon deposit on the spark producing section of the spark plug, the spark producing section may be projected into the passage a distance longer than in the summer season or the southern part of the world to expose substantially all parts of the spark producing section to torch jets so that any carbon deposit on the spark producing section is advantageously burnt away. The spark producing section of the spark plug may be further projected into the passage to further decrease the sectional area of the torch-running passage so that the velocity of torch jets is increased and turbulences are caused in torch jets by the spark producing section, with a resultant advantage that the ignitability of air-fuel mixture charges in the main combustion chamber is improved. Moreover, a dimensional deviation in the sectional area of the torch-running passage due to some slight failure in working or machining thereof can advantageously be compensated by varying the distance over which the spark producing section of a spark plug projects into the passage.

What is claimed is:

1. An internal combustion engine comprising a cylinder block defining therein a cylinder, a cylinder head mounted on the top of said cylinder block, a piston reciprocally mounted in said cylinder and cooperating with said cylinder and cylinder head to define a main combustion chamber, a precombustion chamber adapted to be supplied with a charge of an air-fuel mixture, a passage communicating said precombustion chamber with said main combustion chamber, means for supplying a charge of the air-fuel mixture to said main combustion chamber on an intake stroke of said engine, a part of said charge to said main combustion chamber being forced therefrom through said passage into said precombustion chamber on the succeeding compression stroke of said engine to form a substantial part of said charge to said precombustion chamber, and a spark plug so mounted on said cylinder head as to ignite the air-fuel mixture in said precombustion chamber so that the ignited air-fuel mixture is burnt in said precombustion chamber to produce a torch jet which runs along a path through said passage into said combustion chamber for thereby igniting the air-fuel mixture therein, where said spark plug comprises a generally tubular shell of an electrically conductive material, at least one grounded electrode connected to and extending from one of the end faces of said shell, an insulator axially extending through said shell and having a nose portion extending axially beyond said one end face of said shell, and a center electrode supported by said nose portion of said insulator and extending axially beyond said nose portion, said grounded electrode having a bent end portion extending toward said center electrode to cooperate with the peripheral surface thereof to define a spark gap therebetween, and wherein said center and grounded electrodes extend into said passage to an extent where said electrodes and said nose portion of said insulator are exposed to the rim of a torch jet through said passage.

2. An internal combustion engine according to claim 1, wherein said spark plug has a pair of grounded electrodes disposed in diametrically opposite relationship with respect to each other.

3. An internal combustion engine according to claim 1, wherein said spark plug is so mounted on said cylinder head that the bend end portion of said grounded electrode extends substantially in parallel with the path of run of the torch jet through said passage.

4. An internal combustion engine according to claim 3, wherein said cylinder head and said spark plug have thereon markings which indicate the orientation of said bent end portion of said grounded electrode with respect to the path of run of the torch jet through said passage.

5. An internal combustion engine according to claim 4, wherein said spark plug has screw threads formed on the outer peripheral surface of said shell to mount said spark plug on said cylinder head, and a nut member in threadable engagement with said shell for securing said spark plug to said cylinder head.

* * * * *